No. 896,556. PATENTED AUG. 18, 1908.
W. S. LANGFORD.
BELT FASTENER.
APPLICATION FILED NOV. 18, 1907.
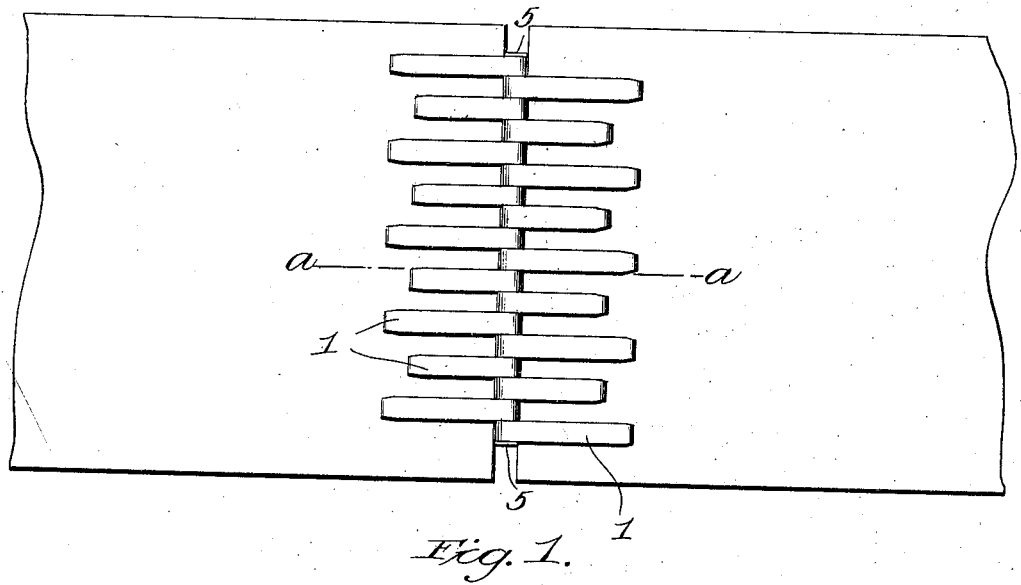
Fig. 1.
Fig. 2.
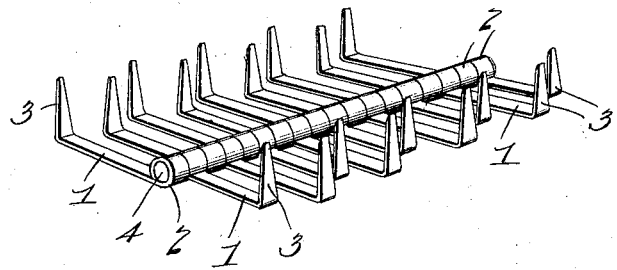
Fig. 3.
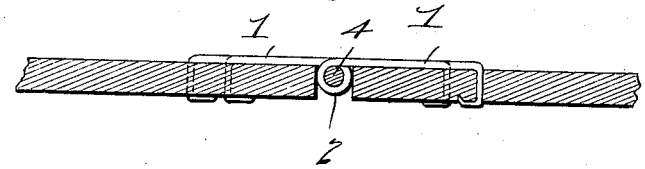
Witnesses
Inventor
William S. Langford
By
Attorney

UNITED STATES PATENT OFFICE.

WILLIAM S. LANGFORD, OF BALTIMORE, MARYLAND.

BELT-FASTENER.

No. 896,556.

Specification of Letters Patent.

Patented Aug. 18, 1908.

Application filed November 18, 1907. Serial No. 402,690.

*To all whom it may concern:*

Be it known that I, WILLIAM S. LANGFORD, a citizen of the United States, residing at Baltimore city and State of Maryland, have invented certain new and useful Improvements in Belt-Fasteners, of which the following is a specification.

This invention relates to improvements in belt fasteners or devices for connecting the ends of belt sections.

The object of the invention is to provide a simple article of manufacture of this character by which the belt sections can be quickly and strongly connected, so that the belt will be rendered pliable at the point of connection.

A further object is to provide a fastening means of this character which will permit either side of the belt to be run against the pulley.

A still further object is to provide a fastener wherein the individual fastener sections will be so mounted upon the pin joining the sections, that the strain upon the pin will be equalized throughout its length, thereby preventing wear at particular points resulting from binding.

I am aware that it is not new to connect the ends of belt sections by means of fastening devices provided with tangs or spurs, adapted to be driven into the belt, and eyes for the passage of a pin common to all of the sections of the fastening devices, whereby the belt sections are held together, but those that I am familiar with embody constructions that render them difficult to attach to the belt sections, requiring such care in the first instance as to almost invariably result in a poor fastening that soon wears through the pin or pulls out of the belt.

In the drawings illustrating the invention; Figure 1 is a plan view of two broken belt sections connected by my fastener; Fig. 2 is a perspective view of the fastener; Fig. 3 is a horizontal section taken about on line *a—a* Fig. 1, showing the appearance of the fastener when applied to a belt.

Referring to the drawings, the numeral 1 designates one of the fastener sections, which is bent at one end to form an eye 2, and at its opposite end it is bent at right angles to the main body to form a spur or tang 3. I preferably form a device with the sections in groups of two long sections and two short sections, alternating throughout the entire width of the fastener as clearly shown in the drawings.

The numeral 4 designates a pin which passes through the eye 2 of all of the fastener sections and is riveted or headed at opposite ends as indicated at 5 to prevent the end sections from slipping off the pin, it being obvious that the end sections prevent lateral movement of all of the intermediate sections. The tangs 3 are driven into and through the belt sections, when their ends are turned down or clenched and embedded into the belt as shown more clearly in Fig. 3. By forming the device of groups of sections alternating long and short, the strain, when the device is applied to the belt, is distributed over a greater area of belt surface.

As shown in Fig. 3, when the device is applied, the eyes come opposite the ends of the belt sections, thereby rendering the belt smooth on both sides and adapting it to be run either side to the pulley. By assembling the individual sections in the first instance, producing a concrete article of varying width, adapted to be attached to belts of corresponding width, I am enabled to get a uniform bearing on the body of the pin throughout its entire length, thereby preventing undue strain or wear upon any particular part of the pin, which invariably results from an effort to properly aline the fastener sections individually along the edges of the belt sections, in cases where the pin is inserted after the fastener sections have been applied.

From the foregoing, it will be seen that an extremely simple and cheap device is provided, requiring no complicated machinery in its manufacture and one possessing great strength and durability.

Claims.

1. An article of manufacture, a belt fastener comprising a series of oppositely extending flat metallic strips adapted when applied to a belt to lie substantially flush with the surface thereof, each strip being provided with an eye at one end and a spur or tang at the other, said spur or tang being approximately at right angles to the body of the strip and adapted to be driven through the belt sections and flattened down or clenched on the opposite side thereof, and a rod passing through the eyes of all of the sections, to which rod said sections are permanently attached.

2. In combination with a belt, a belt fastener comprising a series of oppositely extending flat metallic strips, which lie substantially flush with the surface of the belt sections, each strip having an eye at one end and a spur or tang at the other, said spur or tang being driven through the belt sections and clenched therein on the opposite side of said sections, and a rod passing through the eyes of all of the sections, said rod being provided with a head at each end for preventing the sections from slipping therefrom.

In testimony whereof I affix my signature, in presence of two witnesses.

WILLIAM S. LANGFORD.

Witnesses:
TITIAN W. JOHNSON,
FRANK G. BRERETON.